(12) United States Patent
Sankararaman

(10) Patent No.: US 9,009,212 B2
(45) Date of Patent: Apr. 14, 2015

(54) OPTIMIZED TRANSFER OF APPLICATIONS BETWEEN COMPUTING ENVIRONMENTS

(75) Inventor: Gurusankar Sankararaman, Villa Marina (SG)

(73) Assignee: Cisco Technology, Inc., San Jose, CA (US)

( * ) Notice: Subject to any disclaimer, the term of this patent is extended or adjusted under 35 U.S.C. 154(b) by 507 days.

(21) Appl. No.: 13/171,565

(22) Filed: Jun. 29, 2011

(65) Prior Publication Data

US 2013/0007090 A1   Jan. 3, 2013

(51) Int. Cl.
*G06F 15/16* (2006.01)
*H04L 12/64* (2006.01)
*G06F 11/20* (2006.01)
*H04L 12/00* (2006.01)
*H04L 29/08* (2006.01)
*G06F 9/46* (2006.01)
*G06F 9/50* (2006.01)

(52) U.S. Cl.
CPC .......... *H04L 12/6418* (2013.01); *G06F 11/202* (2013.01); *H04L 12/00* (2013.01); *H04L 67/34* (2013.01); *H04L 67/322* (2013.01); *G06F 9/46* (2013.01); *G06F 9/5088* (2013.01)

(58) Field of Classification Search
CPC .............. G06F 11/202; G06F 11/3442; H04L 67/1034; H04L 67/1095
USPC ............... 709/203, 224, 201; 705/14; 703/22; 719/318; 715/737; 726/26; 707/640; 714/4.1
See application file for complete search history.

(56) References Cited

U.S. PATENT DOCUMENTS

| | | | |
|---|---|---|---|
| 7,496,661 B1 * | 2/2009 | Morford et al. ................ | 709/224 |
| 7,568,056 B2 | 7/2009 | Danilak | |
| 8,230,256 B1 * | 7/2012 | Raut ............................... | 714/13 |
| 8,560,671 B1 * | 10/2013 | Yahalom et al. ............... | 709/224 |
| 2005/0192867 A1 * | 9/2005 | Haitsuka et al. ................ | 705/14 |
| 2006/0104259 A1 | 5/2006 | Caballero-McCann et al. | |
| 2007/0116246 A1 | 5/2007 | Walker et al. | |
| 2009/0089363 A1 * | 4/2009 | Keohane et al. ............... | 709/203 |
| 2010/0082319 A1 * | 4/2010 | Cherkasova et al. ............ | 703/22 |
| 2011/0213753 A1 * | 9/2011 | Manmohan ................... | 707/640 |
| 2011/0314076 A1 * | 12/2011 | Fujiwaka ....................... | 709/201 |
| 2012/0066607 A1 * | 3/2012 | Song et al. ..................... | 715/737 |
| 2012/0072481 A1 * | 3/2012 | Nandlall et al. ............... | 709/203 |
| 2012/0226742 A1 * | 9/2012 | Momchilov et al. .......... | 709/203 |
| 2012/0227058 A1 * | 9/2012 | Hunt et al. ..................... | 719/318 |
| 2013/0167242 A1 * | 6/2013 | Paliwal ........................... | 726/26 |

OTHER PUBLICATIONS http://en.wikipedia.org/wiki/Desktop_vitrualization, "Desktop Virtualization", 4 pages.

(Continued)

*Primary Examiner* — Dustin Nguyen
(74) *Attorney, Agent, or Firm* — Edell, Shapiro & Finnan, LLC

(57) ABSTRACT

Techniques for optimally transferring applications between computing environments are provided. Using a process in a first computing environment, an application running in the first computing environment is monitored. Based on the monitoring, a need is determined to transfer the application from the first computing environment to a second computing environment. The application is transferred from the first computing environment to the second computing environment, and operations of the application are resumed in the second computing environment.

22 Claims, 16 Drawing Sheets

(56) References Cited

OTHER PUBLICATIONS http://en.wikipedia.org/wiki/Dynamic_data_exchange, "Dynamic Data Exchange", 3 pages.
http://en.wikipedia.org/wiki/File_association, "File association", 3pages.
http://hdx.citrix.com/hdx-overview, "HDX™ Technologies", 2 pages.
"Cisco Unified Survivable Remote Site Telephony Version 4.1", 10 pages.
http://en.wikipedia.org/wiki/Object_linking_and_embedding, "Object Linking and Embedding", 8 pages.
"Wyse Thin Computing Software", www.wyse.com, 9 pages.
http://www.wyse.com/products/software/tcx/index.asp, "Wyse Virtualization Software", 2 pages.

* cited by examiner

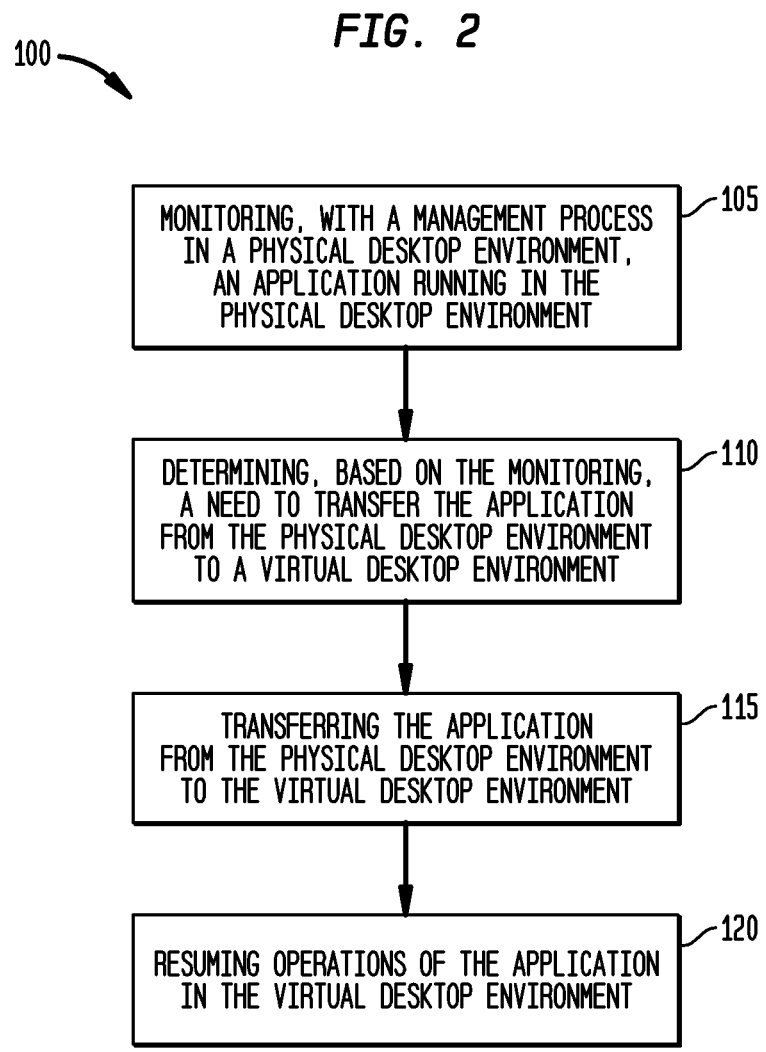

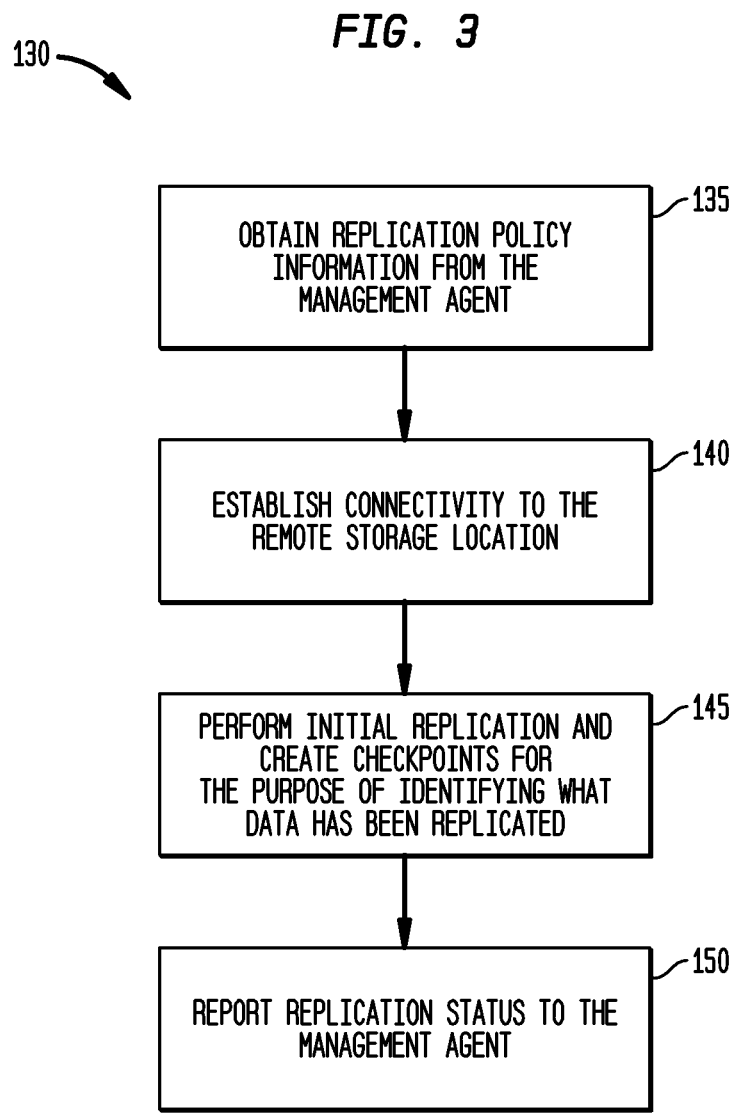

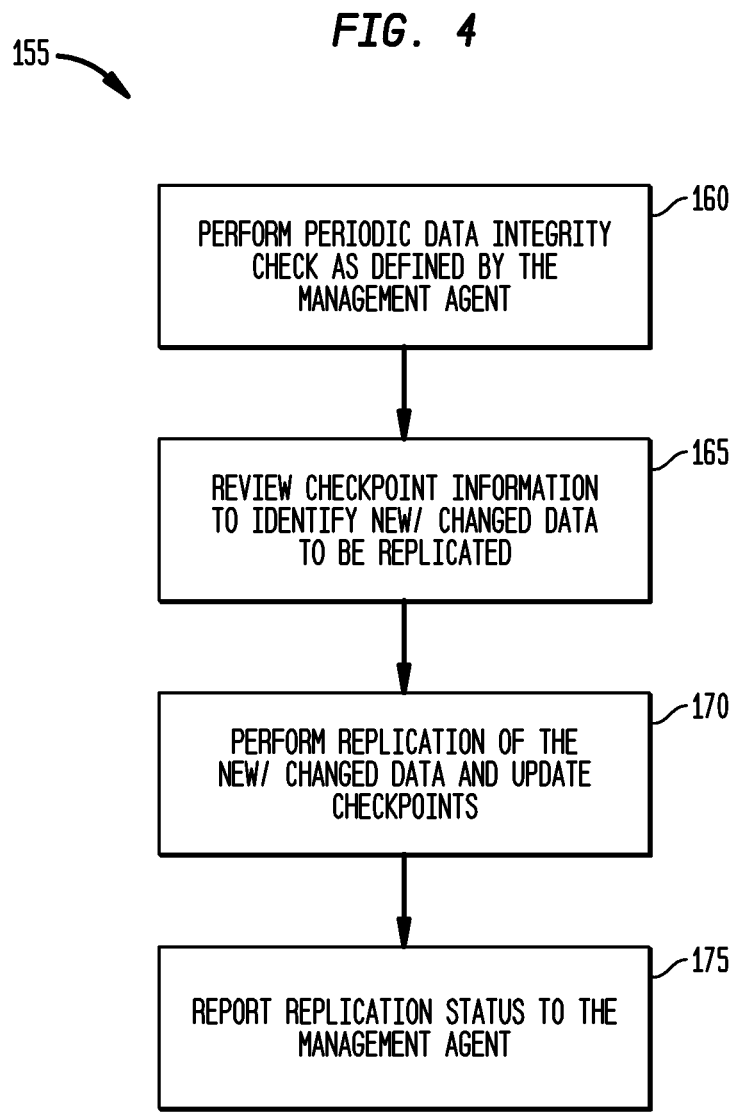

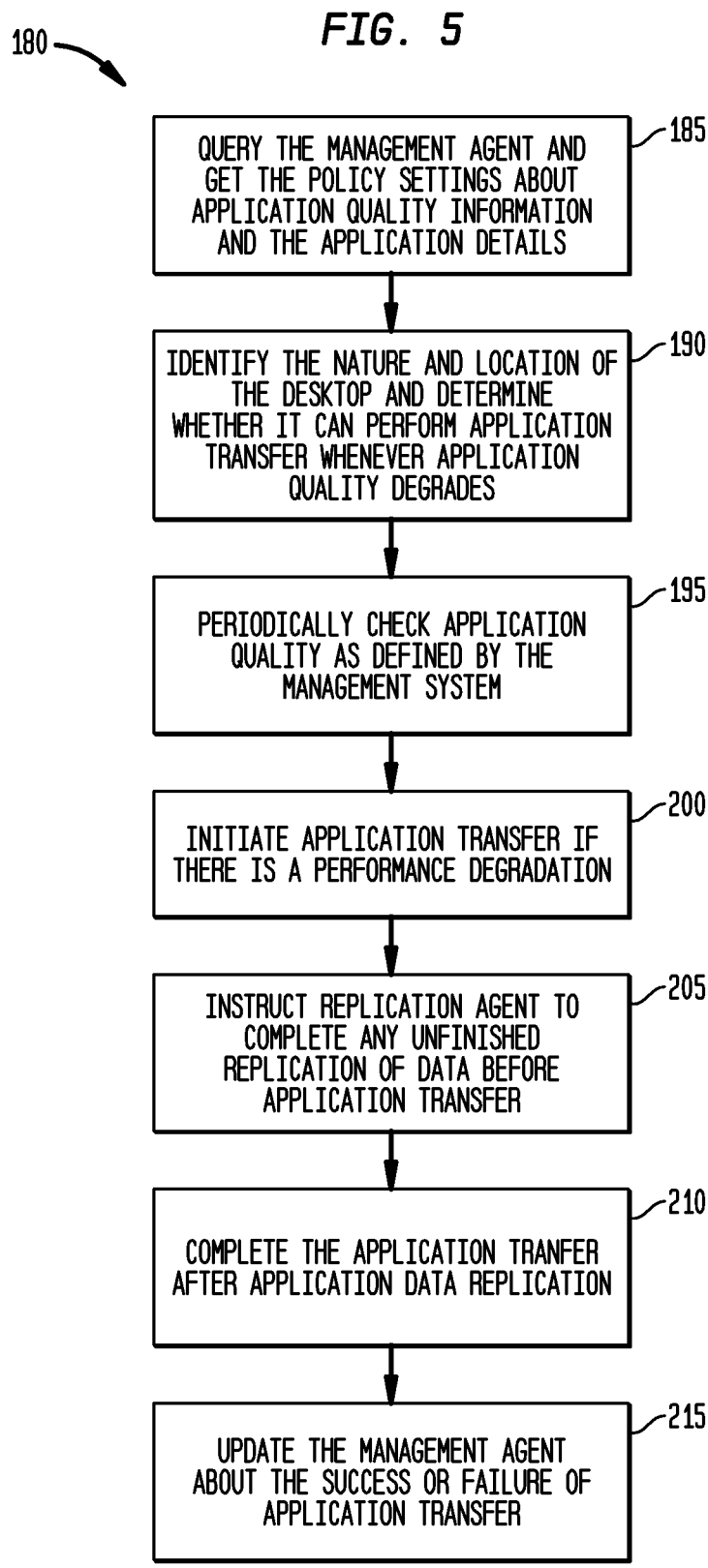

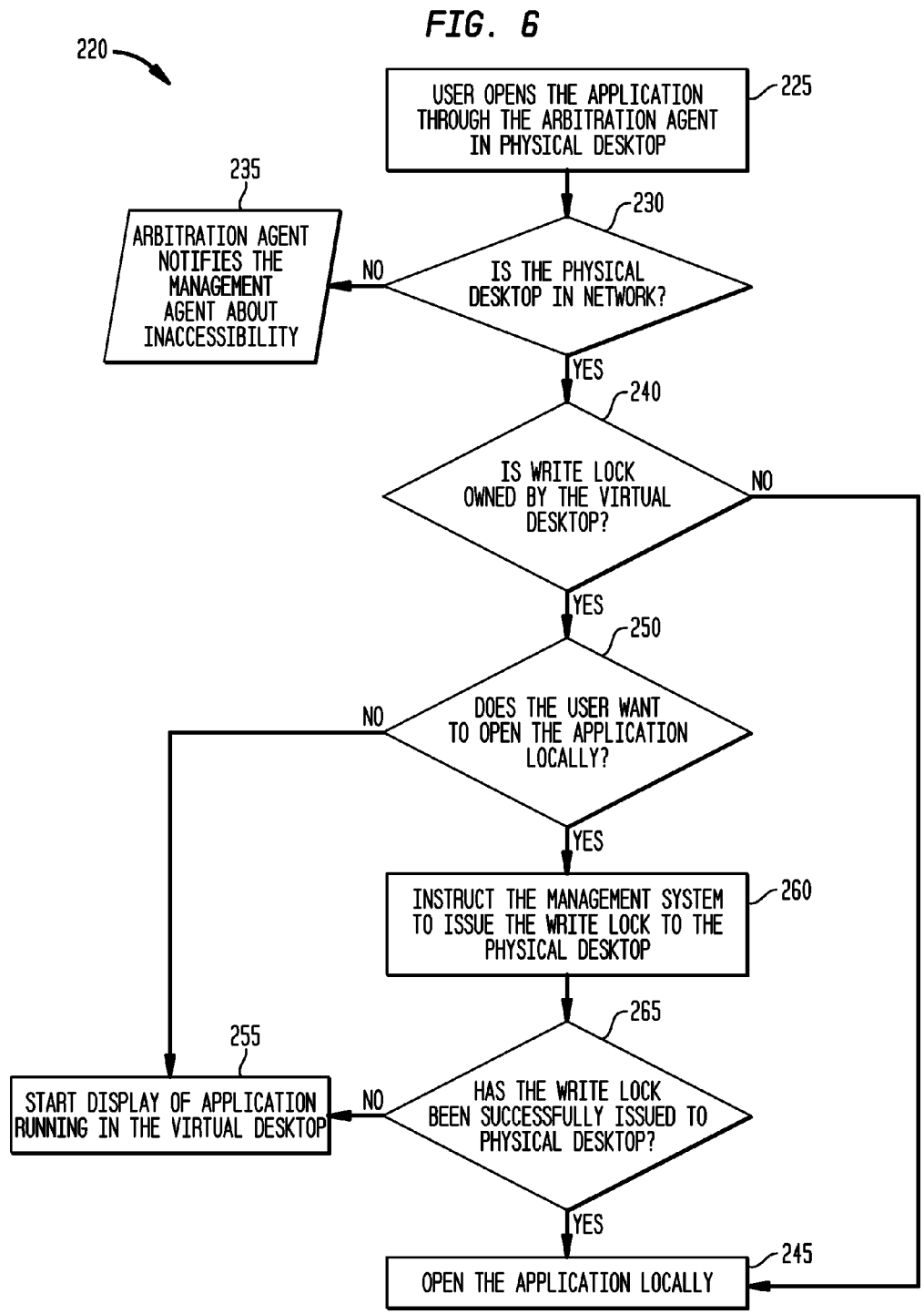

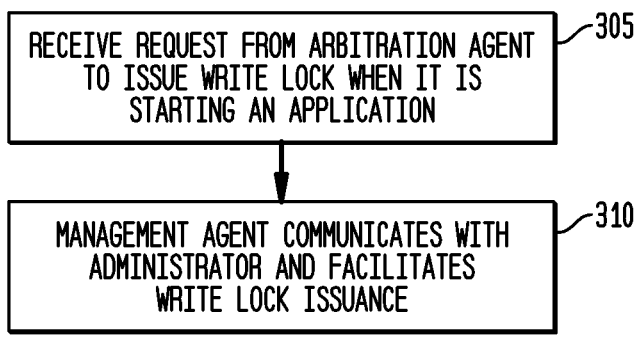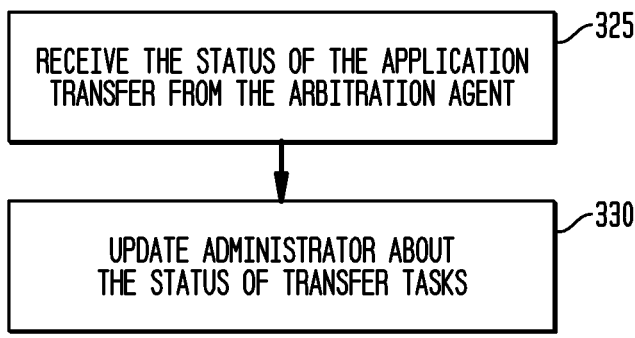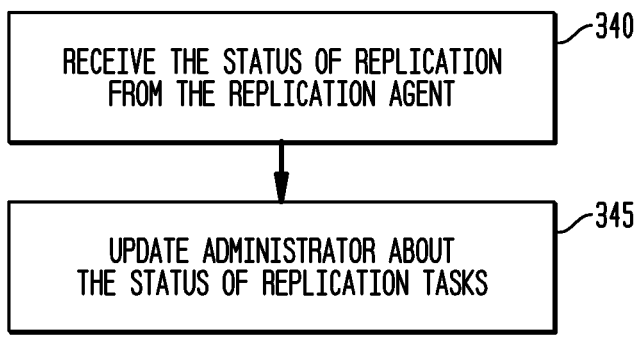

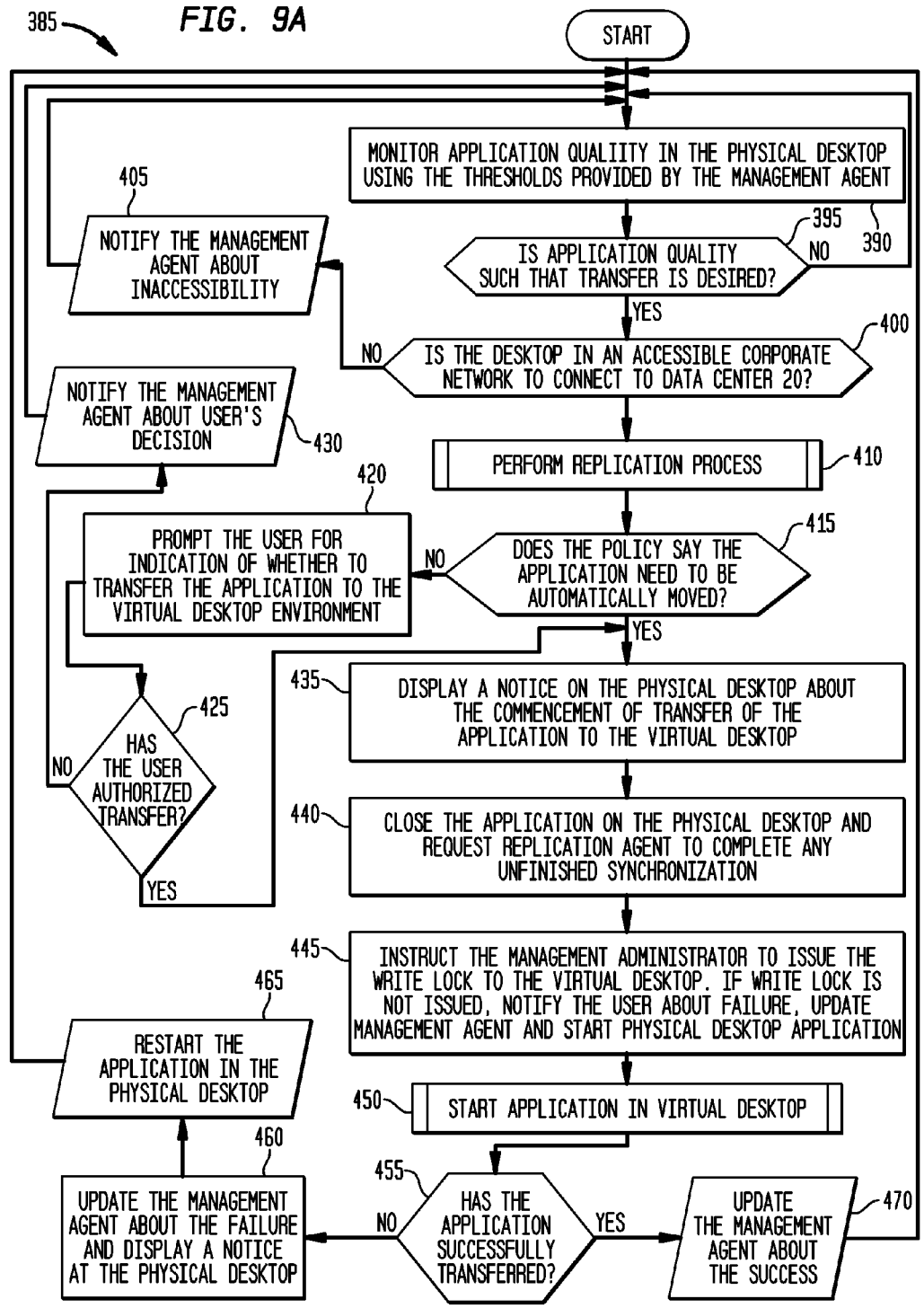

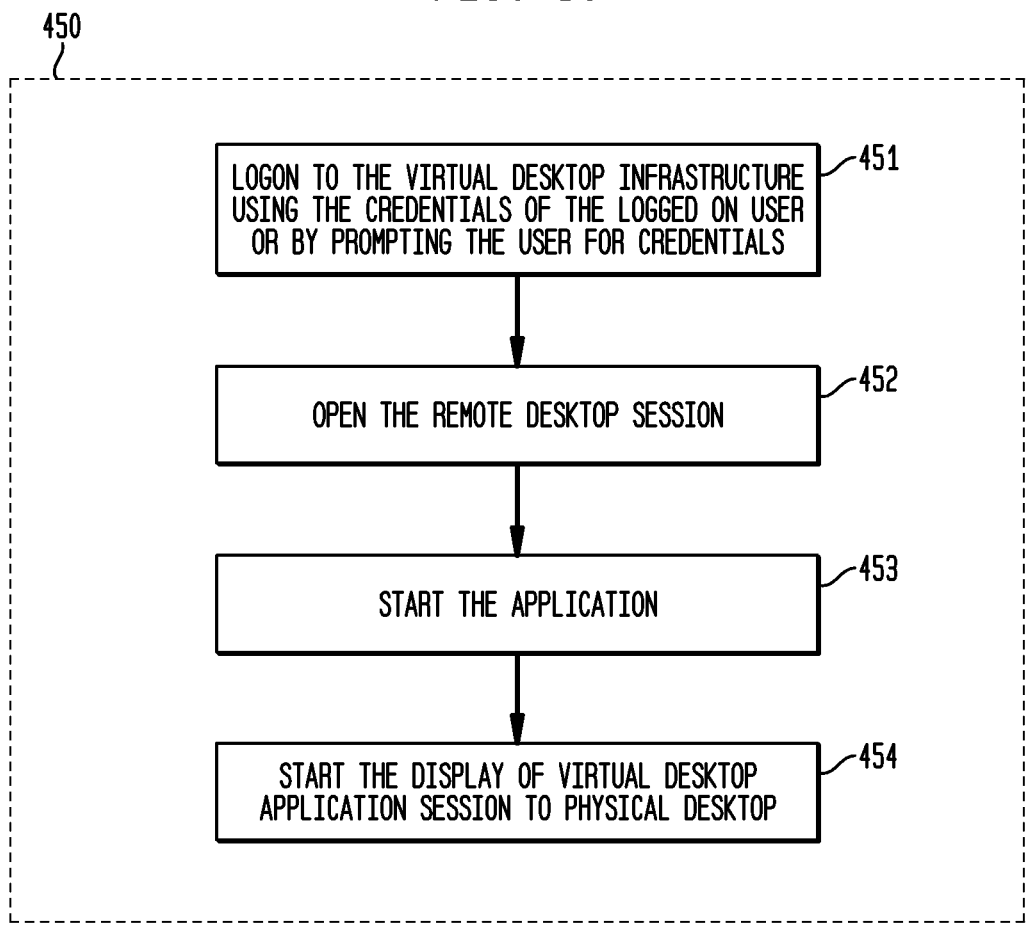

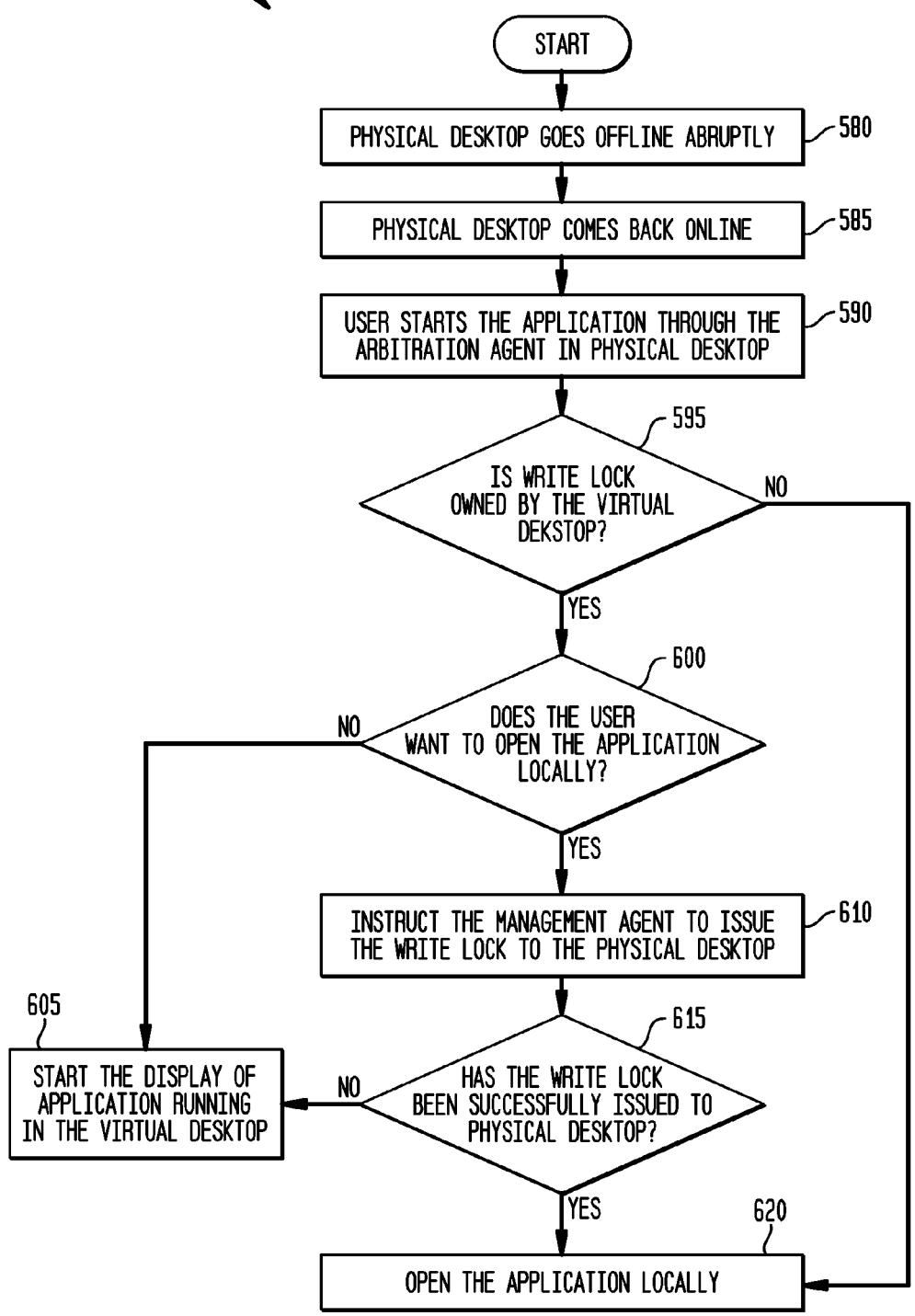

OPTIMIZED TRANSFER OF APPLICATIONS BETWEEN COMPUTING ENVIRONMENTS

TECHNICAL FIELD

The present disclosure relates to optimizing a user's computing experience through transfer of an application between computing environments.

BACKGROUND

In certain enterprise computing systems, users may run an application in a physical desktop environment or a virtual desktop environment. In a physical desktop environment, the user runs the application on a physical, local device (e.g., computer, mobile phone, tablet computer, etc.), while in a virtual or remote desktop environment the user runs the application on a virtual machine (VM) hosted by computing equipment in a data center. A virtual desktop environment is a computing model that uses VM technology (e.g., hypervisor and virtualization software) to "virtualize" a physical computer, including the entire desktop operating system environment, installed applications, memory, and hard disk resources. In such an environment, these resources are encapsulated inside multiple files on a server, collectively constituting a VM. For all practical purposes, a VM is no different than a physical machine in that it has all the required components that make up a full-functional computer. These include a Basic Input/Output System (BIOS), a processor, random access memory (RAM), a network adapter, and hard disk(s). From the user's perspective, the VM presents itself, and operates like, an ordinary physical desktop computer.

BRIEF DESCRIPTION OF THE DRAWINGS

FIG. 2 is a flowchart depicting operations associated with monitoring and transferring of an application.

FIG. 3 is a flowchart illustrating initial replication operations in a computing environment in connection with application transfer between computing environments.

FIG. 4 is a flowchart illustrating synchronization operations in a computing environment in connection with application transfer between computing environments.

FIG. 5 is a flowchart generally illustrating operations of an arbitration agent in physical and virtual desktop computing environments.

FIG. 6 is a flowchart illustrating arbitration agent operations following the start of an application in a physical desktop environment.

FIGS. 7A-7E are flowcharts illustrating management agent operations.

FIG. 9A is a flowchart illustrating one example method for transfer of an application between desktop computing environments.

FIG. 9C is a flowchart illustrating an application startup process used in the method of FIG. 9A.

FIG. 12 is a flowchart of operations performed in one example instance when the transfer of an application between desktop environment occurs in response to a computing event.

DESCRIPTION OF EXAMPLE EMBODIMENTS

Overview

Techniques for optimally transferring applications between computing environments are provided. Using a process in a first computing environment, an application running in the first computing environment is monitored. Based on the monitoring, a need is determined to transfer the application from the first computing environment to a second computing environment. The application is transferred from the first computing environment to the second computing environment, and operations of the application are resumed in the second computing environment.

Example Embodiments

Figure 1:
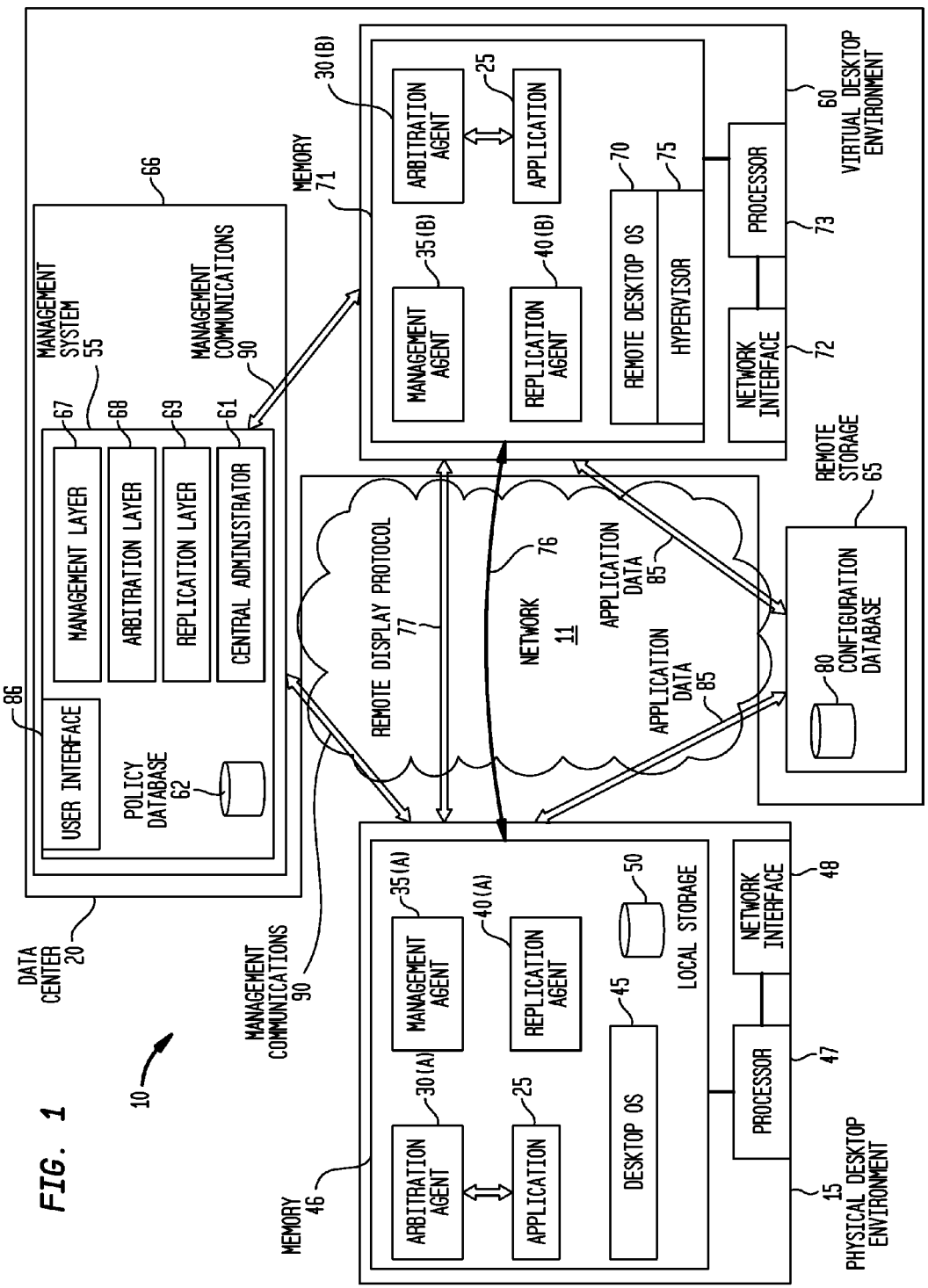
FIG. 1 is a block diagram showing of an example enterprise computing environment configured to implement transfer of an application between computing environments.

FIG. 1 is a block diagram of an enterprise computing system 10 comprising a first computing environment in the form of a physical device (e.g., computer, mobile phone, tablet computer device, etc.), referred to as physical desktop environment 15. Physical desktop environment 15 may run an application 25, arbitration process or agent 30(A), management process or agent 35(A), replication process or agent 40(A), and includes an operating system (OS) 45, memory 46, processor 47, network interface unit 48, and local storage 50. The memory 46 stores computer/processor executable instructions for application 25, arbitration agent 30(A), management agent 35(A), replication agent 40(A) and OS 45. The processor 47 executes the instructions for these various software modules to perform their associated functions.

Physical desktop environment 15 is in communication with a data center 20 by way of a network 11. Data center 20 includes management system software 55 stored in memory, a second computing environment, i.e., virtual desktop computing environment 60, and a remote storage 65. Management system 55 includes a central administrator 61, policy database 62, user interface 66, management layer 67, arbitration layer 68, and replication layer 69. As detailed below, virtual desktop environment 60 may run application 25, arbitration process or agent 30(B), management process or agent 35(B), replication agent 40(B), and includes a remote OS 70, memory 71, network interface 72 and processor 73. Virtual desktop environment 60 may also optionally include a hypervisor 75. Remote storage 65 includes a configuration database 65. The memory 71 stores executable instructions for application 25, arbitration agent 30(B), management agent 35(B), replication agent 40(B), remote OS 70 and hypervisor 75. The processor 73 executes the instructions for these various software modules to perform their associated functions.

Computing system 10 is configured to implement techniques that enable an optimized application experience through the transfer of application 25 between physical desktop environment 15 and virtual desktop environment 60, in either direction. The transfer of application 25 between the physical and virtual computing environments is enabled by management system 55, and the transfer is represented by arrow 76. While a single application 25 is depicted, the techniques described herein are applicable to transferring multiple applications.

Management system 55 may comprise one or more software programs or modules implemented in memory 66. As noted above, management system 55 includes management layer 67, an arbitration layer 68 and a replication layer 69. As described below, these layers may be implemented as software processes or agents in both the physical and virtual environments, and possibly with any dedicated systems external to the environments. More specifically, in one form, management layer 67 includes management agents 35(A) and 35(B) miming in both the physical environment 15 and virtual environment 60, respectively. Similarly, arbitration layer 68 includes arbitration agents 30(A) and 30(B) running in both physical environment 15 and virtual environment 60, respectively, and likewise, replication layer 69 also includes replication agents 40(A) and 40(B) running in both environments, as described above.

Memory 41 in the physical desktop environment 15, memory 66 and memory 71 in data center 20 may comprise read only memory (ROM), random access memory (RAM), magnetic disk storage media devices, optical storage media devices, flash memory devices, electrical, optical, or other physical/tangible memory storage devices. Thus, in general, these memories may comprise one or more computer readable storage media (e.g., a memory device) encoded with software comprising computer executable instructions and when the software is executed it is operable to perform the operations described herein.

The transfer, or the non-transfer, of application 25 between computing environments depends upon which of the physical or environment is the best suited, referred to as the optimal environment, to run the application at any given period in time. The optimal environment is selected by monitoring and evaluating the quality of the application, either by monitoring of the performance of the application or monitoring the resources of the current environment (i.e., the environment in which the application is currently running) or resources in both computing environments, with respect to performance policies. Performance policies may relate to application response times (e.g., a policy is violated if an application takes longer than 2 minutes to respond to a command or 3 minutes to open a file), utilization (lack or overuse) of local resources such as the Central Processing Unit (CPU) (e.g., a policy is violated if CPU usage rises above 90%), if the memory available in the computing environment is too low (e.g., below 100 megabytes (MBs), if average disk queue length is greater than 2, etc.

In one form, the quality of application 25 is monitored or evaluated by comparing a performance metric representative of the quality of the application to a predetermined threshold for the performance metric. In another form, the quality of the application is evaluated by comparing a performance metric representative of the quality of the application to an estimate of the performance metric in virtual desktop environment 60.

In the example of FIG. 1, physical desktop environment 15 is the current environment. The selection of physical desktop environment 15 as the current environment may be due to a default policy setting, historical usage, or other reasons. The evaluation of the application quality is performed by management system 55 through arbitration agent 30(A). In one example, arbitration agent 30(A) constantly monitors the quality of the desktop application experience and validates the operations against quality policies set in management system 55. Arbitration layer 68 may run as a normal user process, kernel process or a protected process that has guaranteed resources or priority over resources to allow it to perform its duties without performance or interruption issues, even during times when access to certain resources is limited.

If arbitration agent 30(A) determines that a policy violation has, or is likely to occur, arbitration agent 30(A) starts the process to transfer application 25 from physical desktop environment 15 to virtual desktop environment 60. In one example, arbitration agent 30(A) may prompt the user to close application 25. Such a prompt may be in the form of a dialog box presented to the user. In another example, arbitration agent 30(A) may automatically close application 25 without notifying the user. As such, in one form, the transfer techniques do not necessarily require the user to close and restart application 25, or for the user to know when degradation has occurred, or is likely to occur.

Additionally, application 25 is automatically transferred and the operation of application 25 is automatically resumed in virtual desktop environment 60. More specifically, application 25 may be resumed within virtual desktop environment 60 by arbitration agent 30(B), without requiring further involvement by the user. This may include the automatic opening of application 25 by arbitration agent 30(B). Therefore, beyond the user's closing of the application (which is only needed in certain instances), no further user involvement is needed for the transfer of application 25 from one computing environment to another environment, or to resume operation of the application in the new environment.

When application 25 is controlled by virtual desktop environment 60, the display of application 25 from the virtual environment is via remote display protocols 77 to the physical device. As described further below, if there is a performance degradation of application 25 at the virtual desktop environment, then the application may be transferred back to physical desktop environment 15.

In order for application 25 to be transferred between environments and, accordingly, properly resumed in the new environment, the data regarding the operational environment of application 25, referred to as application data 85, is synchronized for use in both physical desktop computing environment 15 and virtual desktop computing environment 60. More specifically, management system 55 is configured to ensure that arbitration agent 30(B) has access to recent operational data for application 25. This is facilitated through replication agent 40(A) in physical desktop environment 15 and remote storage 65. Because remote storage 65 is accessible to both environments, replication agent 40(A) is able to store application data 85 into configuration database 80 in remote storage 65. Application data may include, but is not limited to, application configuration data, application binaries, user profile information, open files, browser cookies and any other relevant data that may be used to start the application cleanly with the same state as how it was in the previous environment. Application data 85 may vary for each application, and the implementation approach may be different for different applications. In one form, application data 85 may represent the configuration of application 25 at the time it was closed by arbitration agent 30(A), or at different points in time. This synchronization only occurs when physical desktop environment 15 is in connection with data center 20 and remote storage 65. Replication may be done at the file system level or at the storage block level, and the replication is guided by the policies defined at management layer 67. In one form, replication agent 40(A) constantly synchronizes the application configuration data 85 with the content of database 80, while in other forms the synchronization is periodic.

In the example of FIG. 1, remote storage 65 is within data center 20 and, as such, is always accessible by virtual desktop environment 60. Therefore, when arbitration agent 30(B) opens application 25 within virtual desktop environment 60, the most recent application configuration data 85 may be accessed from database 80.

Should application 25 open in virtual desktop environment 60, replication agent 40(B) will operate similar to replication agent 40(A). Specifically, replication agent 40(B) will constantly or periodically synchronize the application configuration data 85 of application 25 with the content of database 80. Because, as noted above, configuration database 80 is accessible to the elements of physical desktop environment 15, should transfer of application 25 back to the physical desktop be desired, arbitration agent 30(A) may obtain application configuration data 85 from database 80.

As noted, replication agents 40(A) and 40(B) may at times synchronize the current application configuration data 85 with the content of configuration database 80, thereby using the writing of data to the database. To ensure integrity of the content of database 80, write access to remote storage 65, and thus database 80, may be controllably provisioned between replication agents 40(A) and 40(B). Specifically, when physical desktop environment 15 is the current environment, write access to remote storage 65 is given to replication agent 40(A) and the physical environment is said to own application data 85 stored in database 80. In contrast, when virtual desktop environment 60 is the current environment, write access to remote storage 65 is given to replication agent 40(B) and the virtual environment is said to own application data 85 stored in database 80. In one form, replication layer 69 assists in the transfer process by transferring the ownership of remote storage 65 and application configuration data 85 stored therein between the environments. Accordingly, replication layer 69 may include functions that track the current owner of application configuration data 85 in remote storage 65 and functions that lock write access to only the owner. Provisioning write access may be done at the file system layer or at the storage array level.

In certain instances, such as when the physical desktop environment suddenly goes off-line and subsequently restarts, a conflict in taking ownership may arise between physical desktop environment 15 and virtual desktop environment 60. In one form, such conflicts may be resolved by presenting the user with a visual dialog box appearing in the desktop that includes a request to solve the conflict manually or to provide authorization to replication layer 69 to solve the conflict automatically.

As previously noted, in the example of FIG. 1 arbitration agent 30(A) evaluates the quality of the application experience with respect to application or resource usage performance polices. These policies are managed by management layer 67, and are provided to arbitration agent 30(A) through management agent 35(A). Specifically, management communications 90 are passed between the central administrator 61 and management agent 35(A). Management agent 35(B) in virtual desktop environment 60 may similarly communicate with administrator 61 through management communications 90, and pass any required information to arbitration agent 30(B), replication agent 40(B) or other elements of virtual desktop environment 60. The policies and other information may be stored in policy database 62.

Management agents 35(A) and 35(B) in the physical and virtual desktop environments also monitor the operational health and lifecycle of their respective replication agents 40(A) and 40(B) and arbitration agents 30(A) and 30(B). Therefore, because management layer 67 has interfaces to arbitration layer's agents 30(A) and 30(B) and replication layer's agents 40(A) and 40(B), the agents can transmit data representing their health to the management layer as well as receive policy changes and other notifications from the management layer.

In one form, central administrator 61 runs in a system that is separate from the physical and virtual environments. Administrator 61 has access to policy database 62 to obtain general information regarding the application's managed, configuration details, application quality policy and other relevant information. Management system 55 may also include a user interface 66 that allows administrators to manage the infrastructure of system 10 or specific elements thereof.

FIG. 2 is a flowchart illustrating operations of a method 100 for enabling an optimized application experience in computing system 10 of FIG. 1. Method 100 begins at 105 where application 25 is monitored with a process (arbitration agent 30(A)) running in physical desktop environment 15. This monitoring continues until a determination is made at 110 that there is a need to transfer application 25 to virtual desktop environment 60. As noted above, this need to transfer may be based on a determination that the quality of application 25 has fallen below an acceptable threshold. In one form, the quality of application 25 is evaluated by comparing application performance or utilization of resources (in the current environment) to a predetermined threshold. The predetermined threshold is a level at which it has been determined or estimated that application quality will be sufficiently degraded so as to warrant corrective action. In another form, the quality of the application is evaluated by comparing application performance or utilization of resources to an estimate of the same parameter in virtual desktop environment 60.

At 115, application 25 is transferred to the virtual environment. At 120, operations of application 25 are resumed in virtual desktop environment 60.

As previously noted, techniques for transferring applications are implemented through the use of management system 55. Also as noted, management system 55 comprises management layer 67 that includes management agents 35(A) and 35(B), arbitration layer 68 that includes arbitration agents 30(A) and 30(B), and replication layer 69 that includes replication agents 40(A) and 40(B). FIGS. 3 and 4 are flowcharts illustrating examples of operations performed by replication agent 40(A), FIGS. 5 and 6 are flowcharts illustrating examples of operations performed by arbitration agents 30(A) and 30(B), and FIGS. 7-8 are flowcharts illustrating examples of operations performed by management agents 35(A) and 35(B).

More specifically, FIG. 3 illustrates a method 130 of initial replication operations performed by replication agent 40(A) in physical desktop environment. Method 130 begins at 135 where replication agent 40(A) obtains the replication policy information from management agent 35(A). This policy information includes the dataset to be replicated and synchronization settings. At 140, replication agent 40(A) establishes connectivity to remote storage 65 and at 145 the initial replication is performed. This initial replication includes the creation of checkpoints for identifying what data has been replicated. At 150, replication agent 40(A) reports the status of the replication to management agent 35(A).

FIG. 4 illustrates an ongoing or continuous synchronization method 155 that may be implemented by replication agent 40(A). At 160, replication agent 40(A) performs a periodic data integrity check according to the replication policies from management agent 35(A). At 165, replication agent 40(A) reviews the checkpoint information to identify new/changed data to be replicated, and the replication of the new/changed data is performed at 170. The checkpoints are also updated, and, at 175 replication agent 40(A) reports the status of the replication to management agent 35(A).

FIG. 5 is a flowchart generally illustrating the operations of arbitration agents 30(A) and 30(B) to enable transfer of application 25 between physical desktop environment 15 and virtual desktop environment 60, and vice versa. For ease of reference, the operations of FIG. 5 will be described with reference to arbitration agent 30(A) and physical desktop environment 15, and are collectively referred to as method 180. It would be appreciated that the operations of FIG. 5 are not necessarily in order as they would be performed by arbitration agent 30(A), but rather reflect the general capabilities and duties of arbitration agent 30(A).

At 185, arbitration agent 30(A) queries management agent 35(A) to get policy settings regarding, for example, application quality and application details. At 190, arbitration agent 30(A) identifies the nature and location of the desktop environment, and determines whether it is configured to perform application transfer when application quality degrades. At 195, arbitration agent 30(A) periodically checks the application quality in accordance with the policies provided by management system 55. If there is an application quality degradation, arbitration agent 30(A) initiates application transfer at 200. However, arbitration agent 30(A) instructs replication agent 40(A) to complete any unfinished replication of data before the application transfer at 205, and only completes the transfer at 210 after complete replication of the application data. At 215, management agent 35(A) is updated regarding the success or failure of the application transfer.

FIG. 6 illustrates an example method 220 for startup of application 25 in physical desktop environment 15. Method 220 starts at 225 where the user opens the application 25 through arbitration agent 30(A) in physical desktop environment 15. At 230, arbitration agent 30(A) makes a determination as to whether physical desktop environment 15 is in the network (i.e., in communication with data center 20). If physical desktop environment 15 is not in the network, management agent 35(A) is notified of the inaccessibility and transfer is not possible until accessibility is obtained. Arbitration agent 30(A) may periodically return to 230 to re-check if the physical desktop environment has joined the network.

If physical desktop environment 15 is in the network, at 240, arbitration agent 30(A) determines if the write lock to remote storage 65 is owned by virtual desktop environment 60. If virtual desktop environment 60 does not own the write lock, method 220 proceeds to 245 where application 25 is opened locally in physical desktop environment 15. If the write lock is owned by virtual desktop environment 60, arbitration agent 30(A) determines at 350 if the user wants to open application 25 locally. This may include a prompt requesting the user indicate where the application should be opened. If application 25 is not to be opened remotely, method 220 proceeds to 255 and the application is started in virtual desktop environment 60.

Returning to 250, if the user wants to start application 25 locally, arbitration agent 30(A) instructs management system 55 to issue the write lock to physical desktop environment 15. At 265, a determination is made as to whether the write lock has been successfully transferred to physical desktop environment 15. If not, method 220 proceeds to 255 and the application is started in virtual desktop environment 60. If the write lock has been successfully transferred to physical desktop environment 15, the method moves to 245 where application 25 is opened locally.

Figure 7A:
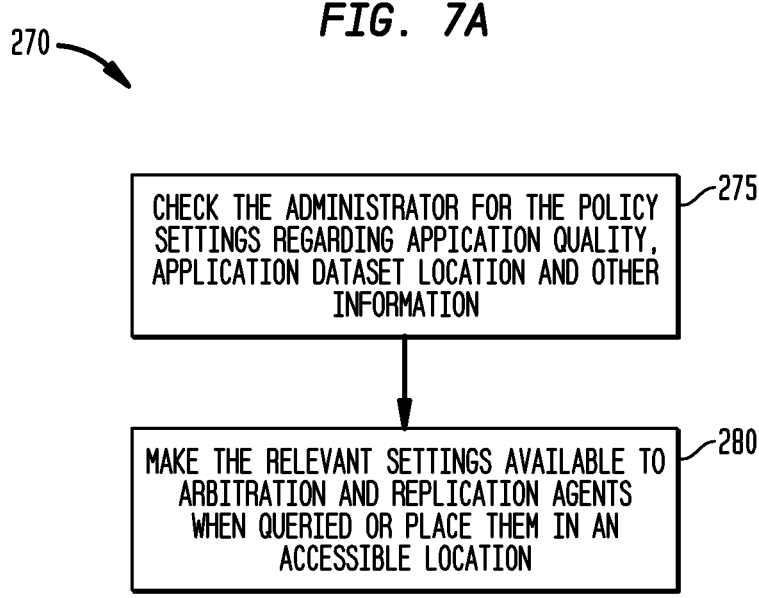

FIGS. 7A-7E are flowcharts illustrating example methods performed by management agent 35(A) in physical desktop environment 15. More specifically, FIG. 7A illustrates a method 270 for general communication of management agent 35(A) with administrator 61 of management system 55. At 275, management agent 35(A) checks administrator 61 for the policy settings regarding application quality, application dataset location and other information. At 280, management agent 35(A) makes the relevant settings available to arbitration agent 30(A) and replication agent 40(A).

Figure 7B:
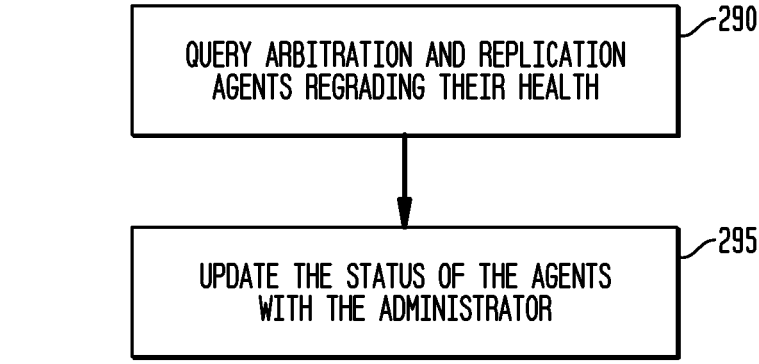
Figure 8:
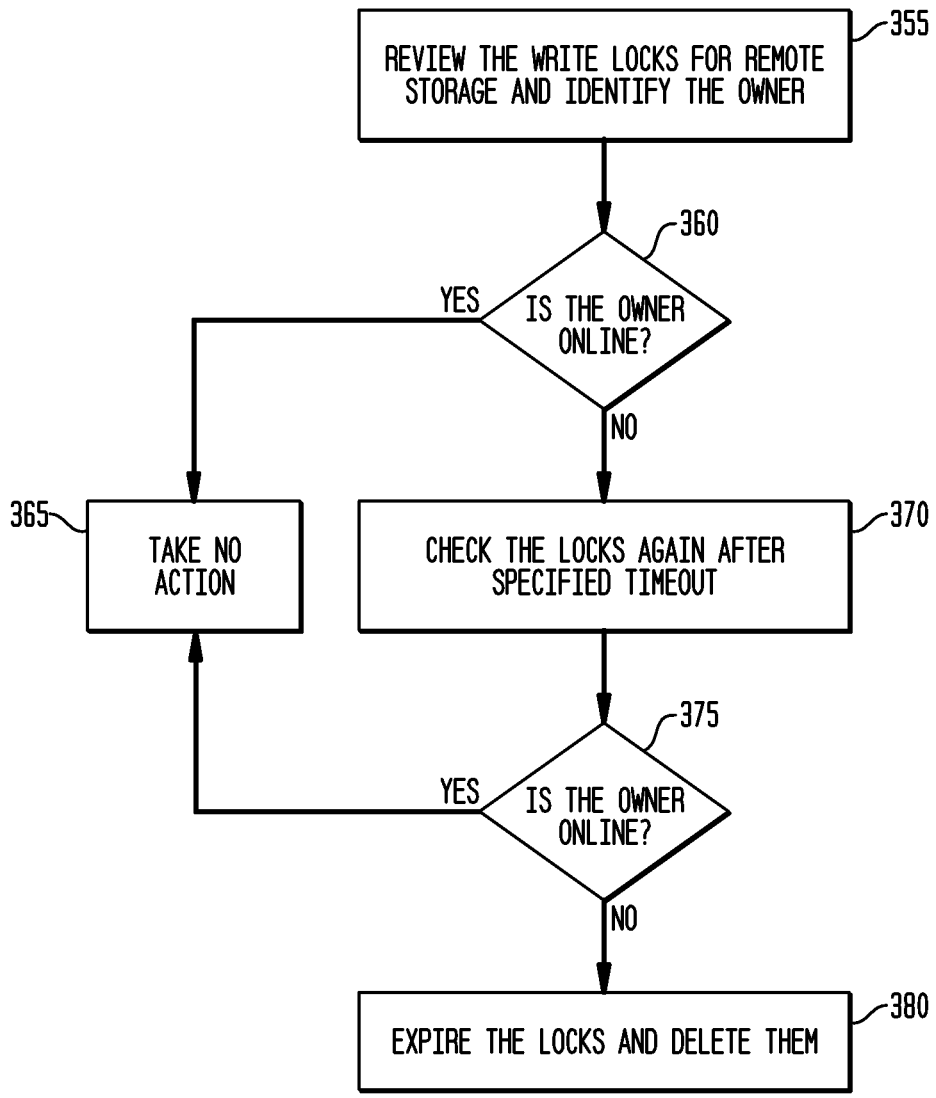
FIG. 8 is a flowchart illustrating write access control operations in connection with application transfer between computing environments.

FIG. 7B illustrates a method 285 of management agent 35(A) for communicating with arbitration agent 30(A) and replication agent 40(A) regarding their health. Specifically, at 290, management agent 35(A) queries arbitration agent 30(A) and replication agent 40(A) to receive an indication of their health, and then updates the status of the agents with administrator 61.

FIG. 7C illustrates a method 300 of communications regarding write access locks. At 305, management agent 35(A) receives a request from arbitration agent 30(A) to issue a write lock when arbitration agent 30(A) tries to start application 25. At 310, management agent 35(A) communicates with administrator 61 and facilitates issuance of the write lock.

FIG. 7D illustrates a method 320 of communication regarding the transfer of application 25. At 325, management agent 35(A) receives the status of the application transfer from arbitration agent 30(A). At 330, management agent 35(A) updates administrator 61 regarding the status of transfer tasks.

FIG. 7E illustrates a method 335 of communication regarding replication. At 340, management agent 35(A) receives the status of the replication from replication agent 40(A). At 345, management agent 35(A) updates administrator 61 regarding the status of replication tasks.

Administrator 61 in management system 55 may have a number of different duties. One such duty is the issuance of write locks for remote storage 65. In one form, administrator 61 issues write locks to physical or virtual desktop environments 15, 60 based on ownership of application 25. More specifically, the write lock is issued to either physical desktop environment 15 or virtual desktop environment 60 once the application is successfully authorized to start in that desktop.

FIG. 8 illustrates another form of write lock management that may be implemented by administrator 61, referred to as method 350. Method 350 begins at 355 where administrator 61 reviews the write lock for remote storage to identify the owners thereof. At 360, a determination is made as to whether the write lock owner is online. If so, method 350 moves to 365 where no action is taken and method 320 terminates. If the write lock owner is not online, method 350 moves to 370 where, after a period of time passes, a check of the ownership is again performed. If, at 375, the owner is now online, at 365, no action is taken and the method terminates. If the owner is not online, at 380, the write locks are caused to expire and are deleted.

It should be appreciated that administrator 61 may perform a number of other functions or duties. One general function is to enable user interface 66, thereby allowing network operators or other users to define application quality settings and perform other operations.

FIGS. 9A-12 are flowcharts illustrating different implementation scenarios for system 10. Specifically, FIG. 9A is a flowchart of a method 385 in which application 25 is running in physical desktop environment 15. After application 25 starts, at 390, the application quality is monitored using threshold levels provided by management layer 67. As previously noted, the application quality may be determined based on the application performance, resource utilization, etc. At 395, an evaluation is performed to determine if the application quality is such that transfer of application 25 to a different computing environment is desired. That is, arbitration agent 30(A) determines if the application quality is below one or more of the above thresholds. If the application quality does not warrant transfer, method 385 returns to 390 for continued monitoring of the application quality.

If application transfer is appropriate, the method progress to 400 where a check is performed to determine if physical desktop environment 15 is in an accessible corporate environment with data center 20. If physical desktop environment 15 is not in an accessible network with data center 20, the method progresses to 405 where management agent 35(A) is notified of the inaccessibility. Method 385 returns to 390 for continued monitoring of the application quality.

If physical desktop environment 15 is in an accessible corporate environment, the method proceeds to 410 where a replication process is performed. Details of this replication process are provided below with reference to FIG. 9B. Next, at 415, a check is performed to determine if the policies set in management layer 67 require an automatic transfer of application 25. If not, a prompt requesting the user to confirm transfer is generated at 420, and a check for the user's authorization to perform the transfer is performed at 425. If the user has not authorized the transfer, management agent 35(A) is notified of the user's decision, and method 385 returns to 390 for continued monitoring of the application quality.

If automatic transfer is required at 415, or the user has authorized transfer at 425, method 385 progresses to 435 where a notice regarding the commencement of the transfer of application 25 to virtual desktop environment 60 is provided to the user via physical desktop environment 15. Next, at 440, the application is closed in physical desktop environment 15 and requests for replication agent 40(A) to complete any remaining replication are generated. At 445, the management agent is instructed to issue the write lock to virtual desktop environment 60. If the write lock is not issued, the user is notified about the failure, the management agent is updated and the applications may be restarted in physical desktop environment 15.

If the write lock is issued to virtual desktop environment 60, application 25 is started in the virtual desktop environment at 450. Further details of the operations performed to start application 25 in virtual desktop environment 60 are provided below with reference to FIG. 9C.

At 455, a check is performed to determine if application 25 has properly transferred. If not, at 460, the management agent is updated about the failure and a notice is displayed to the user at physical desktop environment 15. At 465, application 25 is restarted in physical desktop environment 15, and method 385 returns to 390 for continued monitoring of the application quality. If it is determined at 455 that application 25 was properly transferred, method 385 progresses to 470 where the management agent is updated regarding the success, and the method returns to 390 for continued monitoring of the application quality.

Figure 9B:
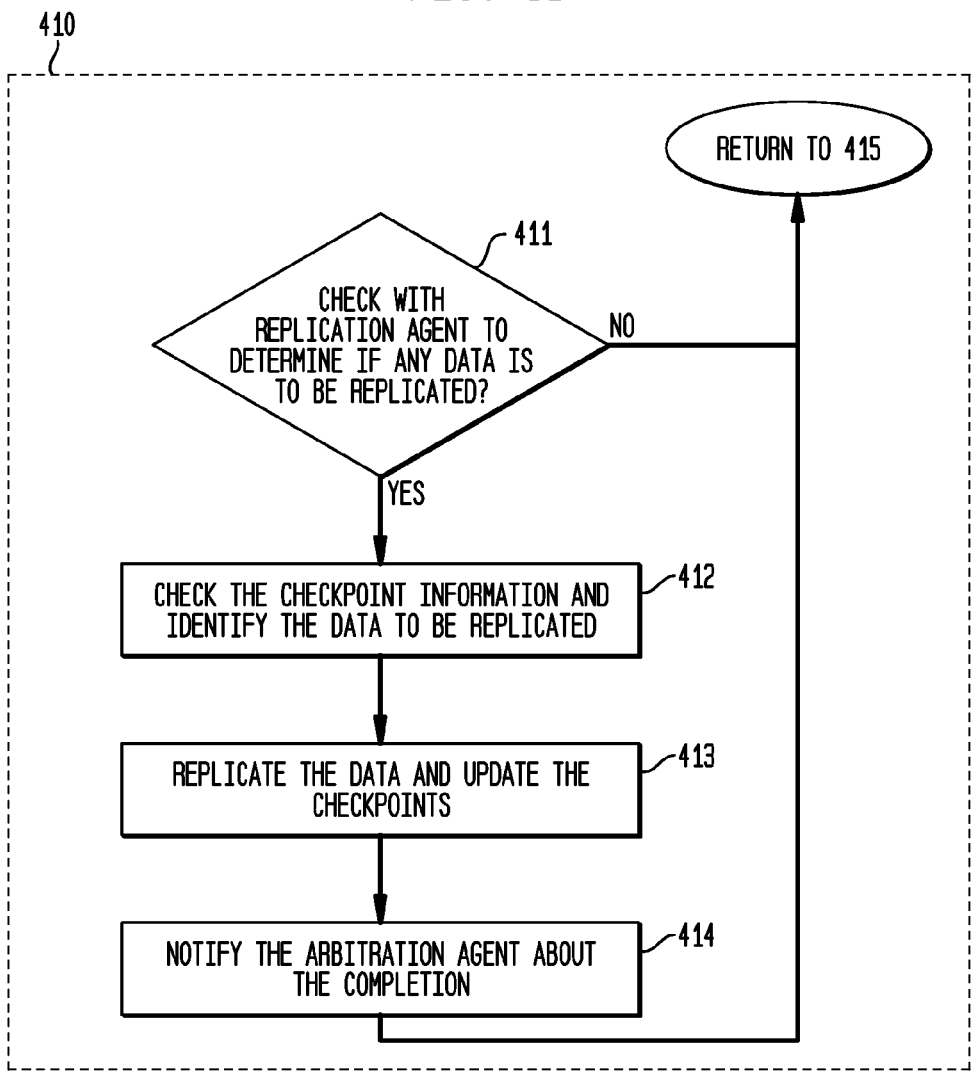
FIG. 9B is a flowchart illustrating a replication process used in the method depicted in FIG. 9A.

As previously noted, a replication process is performed at 410, and FIG. 9B illustrates the details of this process. First, at 411, a check is performed to determine if any data is to be replicated. If not, the process ends and returns to 415 of FIG. 9A. If data does need to be replicated, at 412 the checkpoint information is evaluated to identify the data that needs to be replicated. At 413, the data is replicated and the checkpoint information is updated. At 414, arbitration agent 30(A) is notified of the completion, and the process ends and returns to 415 of FIG. 9A.

Application 25 is started in virtual desktop environment 60 at 450. The details of this startup process are shown in FIG. 9C. Specifically, at 451, the system logs onto virtual desktop infrastructure using the credentials of the logged on user or by prompting the user for credentials. At 452, the virtual desktop session is opened, and application 25 is started at 453. At 454, the display of the virtual desktop session is provided to the user via the physical desktop environment 15.

Figure 10A:
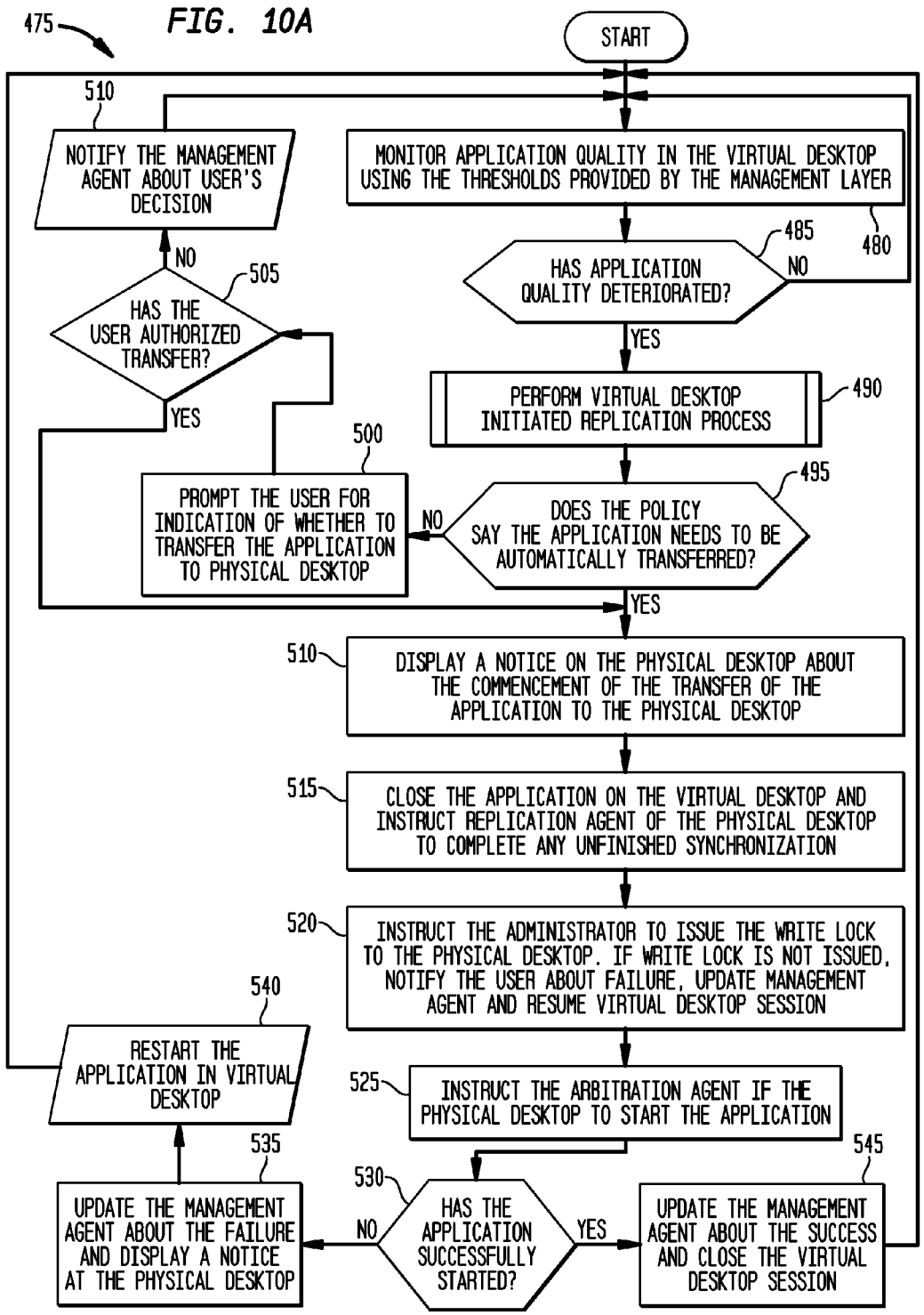
FIG. 10A is a flowchart illustrating one example method for transfer of an application between desktop computing environments.

FIG. 10A is a flowchart of a method 475 in which application 25 is running in virtual desktop environment 60. After application 25 starts, at 480 the application quality is monitored using threshold levels provided by management layer 67. As previously noted, the application quality may be determined based on the application performance, resource utilization, etc. At 485, an evaluation is performed to determine if the application quality is such that transfer of application 25 to a different computing environment is desired. That is, arbitration agent 30(B) determines if the application quality is below one or more of the above thresholds. If the application quality does not warrant transfer, method 475 returns to 480 for continued monitoring of the application quality.

If application transfer is desired, the method progresses to 490 where a virtual desktop initiated replication process is performed. Details of this replication process are provided below with reference to FIG. 10B. Next, at 495, a check is performed to determine if the policies set in management layer 67 require an automatic transfer of application 25. If not, a prompt requesting the user to confirm transfer is generated at 500, and a check for the user's authorization to perform the transfer is performed at 505. If the user has not authorized the transfer, management agent 35(B) is notified of the user's decision, and method 475 returns to 480 for continued monitoring of the application quality.

If automatic transfer is required at 495, or the user has authorized transfer at 505, method 475 progresses to 510 where a notice regarding the commencement of the transfer of application 25 to physical desktop environment 15 is provided to the user via the physical desktop environment. Next, at 515, the application is closed in virtual desktop environment 60 and requests for replication agent 40(B) to complete any remaining replication are generated. At 520, the management agent is instructed to issue the write lock to physical desktop environment 15. If the write lock is not issued, the user is notified about the failure, the management agent is updated and the applications may be restarted in virtual desktop environment 60.

If the write lock is issued to physical desktop environment 15, application 25 is started in the physical desktop environment 15 at 525 through instructions to arbitration agent 30(A). At 530, a check is performed to determine if application 25 has properly transferred. If not, at 535, the management agent is updated about the failure and a notice is displayed to the user at physical desktop 15. At 540, application 25 is restarted in virtual desktop 60, and method 475 returns to 480 for continued monitoring of the application quality. If it is determined at 530 that application 25 was properly transferred, method 475 progresses to 545 where the management agent is updated regarding the success and the virtual desktop session is closed. The method then returns to 480 for continued monitoring of the application quality.

Figure 10B:
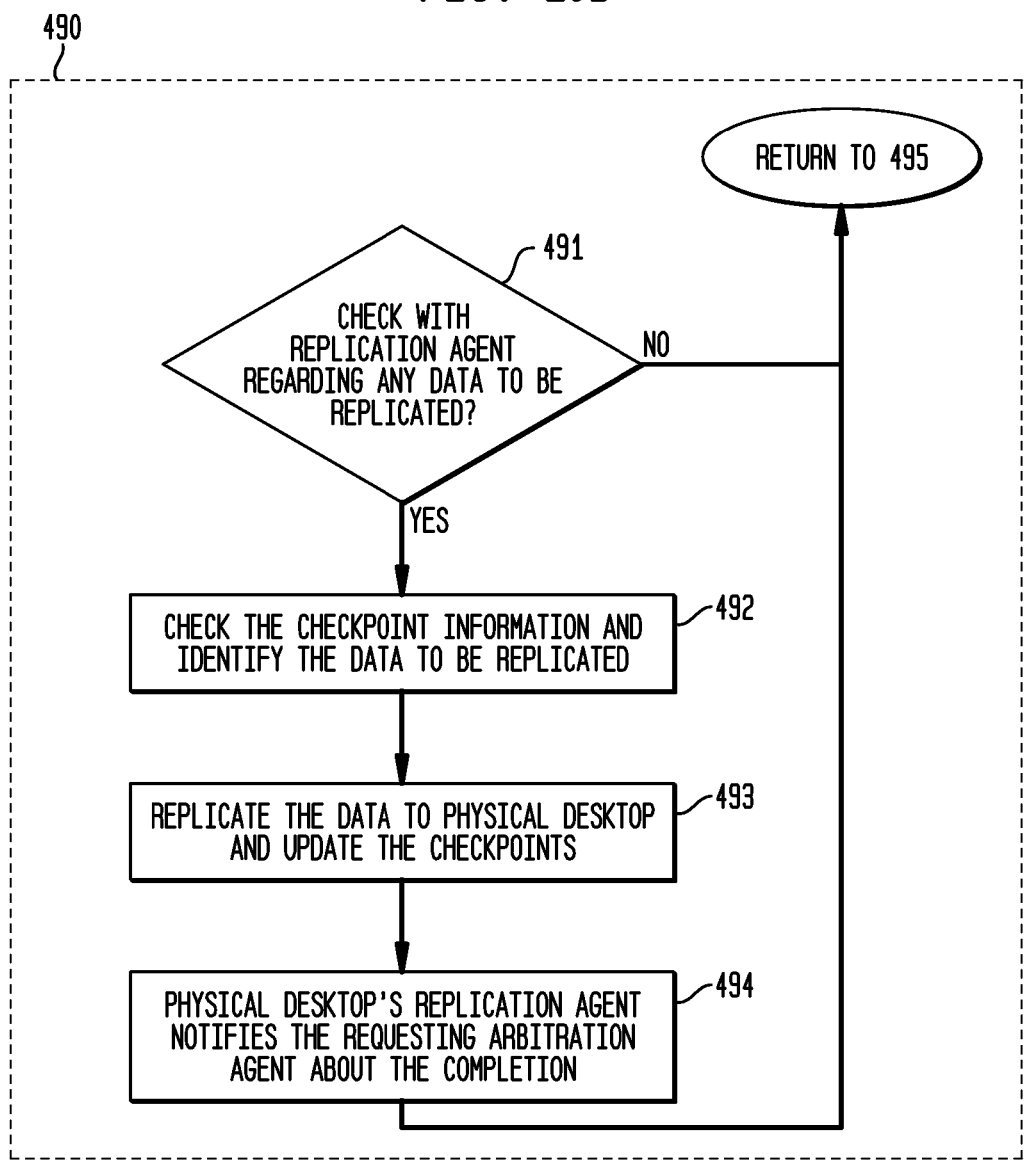
FIG. 10B is a flowchart illustrating a replication process used in the method depicted in FIG. 10A.

As previously noted, a virtual desktop initiated replication process is performed at 490, and FIG. 10B illustrates the details of this process. First, at 491, a check is performed to determine if any data is to be replicated. More specifically, this check is performed with replication agent 40(A) of physical desktop 15 about any data of the concerned application to be replicated to the local storage of the physical desktop. If no data is to be replicated, the process ends and returns to 495 of FIG. 10A. If data does need to be replicated, at 492 the checkpoint information is evaluated to identify the data that needs to be replicated. At 493, the data is replicated and the checkpoint information is updated. At 494, arbitration agent 30(B) is notified of the completion, and the process ends and returns to 495 of FIG. 10A.

Figure 11:
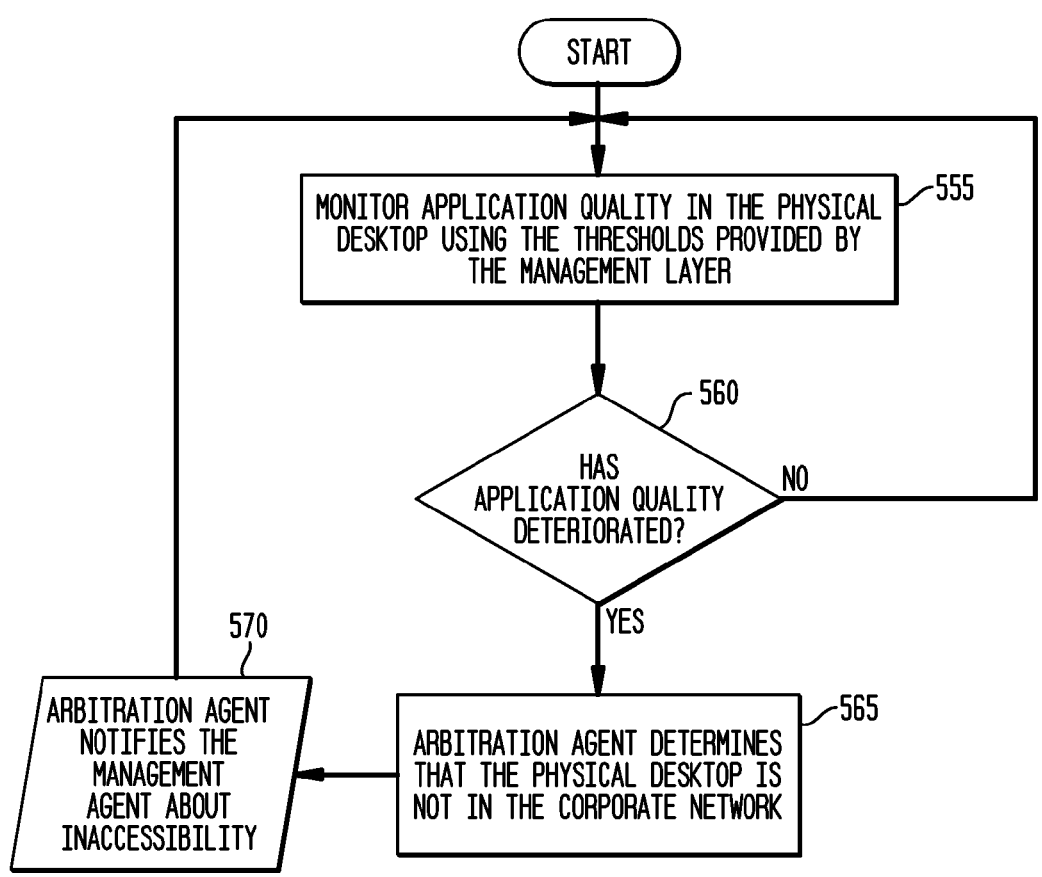
FIG. 11 is a flowchart of operations performed in one example when an application is not transferred between computing environments.

FIG. 11 is a flowchart of a method 550 in which an application 25 is running on physical desktop environment 15. In this example, physical desktop environment 15 is not in a corporate environment and, as such, transfer of application 25 is not possible.

More specifically, after application 25 starts, at 555 the application quality is monitored using threshold levels provided by management layer 67. At 560, an evaluation is performed to determine if the application quality is such that transfer of application 25 to a different computing environment is desired. That is, arbitration agent 30(A) determines if the application quality is below one or more of the above thresholds. If the application quality does not warrant transfer, method 550 returns to 555 for continued monitoring of the application quality.

If application transfer is desired, the method proceeds to 565 where a check is performed to determine if physical desktop environment 15 is in an accessible corporate environment to connect to data center 20. As noted, in this example, physical desktop environment 15 is not in an accessible network with data center 20. As such, the method progresses to 570 where management agent 35(A) is notified of the inaccessibility. Method 550 returns to 555 for continued monitoring of the application quality.

FIG. 12 is a flowchart of an example in which application 25 is running in virtual desktop environment 60. At 580, physical desktop environment 15 abruptly goes offline, and comes back on line at 585. At 590, application 25 is restarted in physical desktop environment 15 through arbitration agent 30(A). After restart, a check is performed at 595 to determine if the write local for remote storage 65 is still owned by virtual desktop 60. If not, application 25 is opened locally at 620.

If it is determined at 595 that the write local for remote storage 65 is still owned by virtual desktop 60, method 575 progresses to 600 where a check is determined if the user wants to open application 25 locally. If not, at 605, application 25 is opened in virtual desktop environment 60. However, if the user does want to open application 25 remotely, the method moves to 610 where the management agent is instructed to issue the write lock to physical desktop 15. A check is then performed at 615 to ensure to determine if the write lock was transferred to physical desktop 15. If the write lock was not transferred, application 25 is opened remotely at 605. If the write lock was transferred, application 25 is opened locally at 620.

The above description is intended by way of example only.

What is claimed is:

1. A method comprising:
   monitoring, with a process running in a local physical desktop computing environment, the quality of an application running in the local physical desktop computing environment;
   determining, based on the quality of the application running in the local physical desktop computing environment, a need to transfer the application from the local physical desktop computing environment to a remote virtual desktop computing environment;
   transferring the application from the local physical desktop computing environment to the remote virtual desktop computing environment; and
   resuming operations of the application in the remote virtual desktop computing environment;
   wherein monitoring the quality of the application comprises:
   evaluating the quality of the application by comparing a performance metric representative of the quality of the application in the local physical desktop computing environment to an estimate of the performance metric representing an estimated quality of the application if the application was running in the remote virtual desktop computing environment.

2. The method of claim 1, wherein monitoring the quality of the application comprises:
   evaluating the quality of the application by comparing a performance metric representative of the quality of the application in the local physical desktop computing environment to a predetermined threshold for the performance metric.

3. The method of claim 1, wherein monitoring the quality of the application comprises:
   evaluating the resources of the local physical desktop computing environment with respect to one or more performance policies.

4. The method of claim 1, further comprising:
   synchronizing application data relating to the operation of the application in a storage location that is accessible to both the local physical desktop computing environment and the remote virtual desktop computing environment, wherein the synchronized application data is usable to operate the application in both the local physical desktop computing environment and the remote virtual desktop computing environment.

5. The method of claim 4, wherein storing the application data comprises:
   continually or periodically synchronizing application configuration data with content of a configuration database in the storage location.

6. The method of claim 4, wherein resuming the application in the remote virtual desktop computing environment comprises:
   accessing the application data stored in the storage location for use in the remote virtual desktop computing environment.

7. The method of claim 4, further comprising:
   controllably provisioning write access to the storage location between the local physical desktop and the remote virtual desktop computing environments depending on which environment is running the application.

8. The method of claim 1, wherein transferring the application from the local physical desktop computing environment to the remote virtual desktop computing environment further comprises:
   prompting a user of the application to close the application.

9. The method of claim 1, wherein transferring the application from the local physical desktop computing environment to the virtual desktop computing environment further comprises:
   automatically closing the application.

10. The method of claim 1, wherein resuming the application in the remote virtual desktop computing environment comprises:
    automatically opening the application in the remote virtual desktop computing environment.

11. The method of claim 1, further comprising:
    identifying a conflict between the local physical desktop computing environment and the remote virtual desktop computing environment in taking ownership of the application;

presenting the user with a visual dialog box appearing in the local physical desktop computing environment that includes a request to solve the conflict manually or to provide authorization to solve the conflict automatically.

12. The method of claim 1, further comprising:

monitoring, with a process in the remote virtual desktop computing environment, the quality of the application in the remote virtual desktop computing environment;

determining, based on the monitoring of the quality of the application in the remote virtual desktop computing environment, a need to transfer the application from the remote virtual desktop computing environment back to the local physical desktop computing environment;

transferring the application from the remote virtual desktop computing environment back to the local physical desktop computing environment; and resuming operations of the application in the local physical desktop computing environment.

13. One or more computer readable storage media encoded with software comprising computer executable instructions and when the software is executed operable to:

monitor, with a process running in a remote virtual desktop computing environment, the quality of an application running in the remote virtual desktop computing environment;

determine, based on the quality of the application, a need to transfer the application from the remote virtual desktop computing environment to a local physical desktop computing environment;

transfer the application from the remote virtual desktop computing environment to the local physical desktop computing environment; and resume operations of the application in the local physical desktop computing environment;

wherein the instructions operable to monitor the quality of the application further comprise instructions operable to:

evaluate the quality of the application by comparing a performance metric representative of the quality of the application in the remote virtual desktop computing environment to an estimate of the performance metric representing an estimated quality of the application if the application was running in the local physical desktop computing environment.

14. The computer readable storage media of claim 13, wherein the instructions operable to monitor the quality of the application further comprise instructions operable to:

evaluate the quality of the application by comparing a performance metric representative of the quality of the application in the remote virtual desktop computing environment to a predetermined threshold for the performance metric.

15. The computer readable storage media of claim 13, further comprising instructions operable to:

synchronize application data relating to the operation of the application in a storage location that is accessible to both the remote virtual desktop computing environment and the local physical desktop computing environment, wherein the synchronized application data is usable to operate the application in both the local physical desktop computing environment and the remote virtual desktop computing environment.

16. The computer readable storage media of claim 15, further comprising instructions operable to:

controllably provision write access to the storage location between the remote virtual desktop and the local physical desktop computing environments depending on which environment is running the application.

17. The computer readable storage media of claim 13, wherein the instructions operable to resume the application in the local physical desktop computing environment further comprise instructions operable to:

automatically open the application in the local physical desktop computing environment.

18. The computer readable storage media of claim 13, wherein the instructions operable to monitor the quality of the application further comprise instructions operable to:

evaluate the resources of the remote virtual desktop computing environment with respect to one or more performance policies.

19. The computer readable storage media of claim 13, further comprising instructions operable to:

monitor quality of the application in the local physical desktop computing environment;

determine, based on the monitoring in the local physical desktop computing environment, a need to transfer the application from the local physical desktop computing environment back to the remote virtual desktop computing environment;

transfer the application from the local physical desktop computing environment back to the remote virtual desktop computing environment; and resume operations of the application in the remote virtual desktop computing environment.

20. An apparatus comprising:

a network interface unit configured to enable communications over a network;

a processor configured to be coupled to the network interface unit; and a memory configured to be coupled to the processor and to store instructions for execution by the processor in a local physical desktop computing environment, including instructions that cause the processor to:

monitor, with a process running in the local physical desktop computing environment, the quality of an application running in the physical desktop computing environment;

determine, based on the quality of the application running in the local physical desktop computing environment, that the application needs to be transferred from the local physical desktop computing environment to a remote virtual desktop computing environment; and transfer the application from the local physical desktop computing environment to the remote virtual desktop computing environment;

wherein the processor is further configured to:

evaluate the quality of the application by comparing a performance metric representative of the quality of the application in the local physical desktop computing environment to an estimate of the performance metric representing an estimated quality of the application if the application was running in the remote virtual desktop computing environment.

21. The apparatus of claim 20, wherein the processor is further configured to:

evaluate the quality of the application by comparing a performance metric representative of the quality of the application in the local physical desktop computing environment to a predetermined threshold for the performance metric.

22. The apparatus of claim 20, wherein the processor is further configured to:

evaluate the resources of the local physical desktop computing environment with respect to one or more performance policies.

\* \* \* \* \*